United States Patent
Foschaar et al.

(10) Patent No.: US 6,236,445 B1
(45) Date of Patent: May 22, 2001

(54) METHOD FOR MAKING TOPOGRAPHIC PROJECTIONS

(75) Inventors: James A. Foschaar, Thousand Oaks; Hugh L. Garvin, Malibu, both of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 08/603,842

(22) Filed: Feb. 22, 1996

(51) Int. Cl.[7] .............................. G02F 1/1339; G03C 5/00
(52) U.S. Cl. .......................... 349/156; 349/155; 430/321
(58) Field of Search ................... 430/4, 5, 6, 7, 430/20, 319, 321, 270; 349/155, 156, 139, 149, 187; 445/24, 40

(56) References Cited

U.S. PATENT DOCUMENTS

| | | | |
|---|---|---|---|
| 4,422,731 | * 12/1983 | Droguet et al. | 349/155 |
| 4,600,273 | * 7/1986 | Ohno | 349/155 |
| 4,728,174 | 3/1988 | Grinberg et al. | |
| 4,826,293 | 5/1989 | Grinberg et al. | |
| 4,923,421 | * 5/1990 | Brodie et al. | 445/24 |
| 5,114,826 | * 5/1992 | Kwong et al. | 430/270 |
| 5,148,103 | 9/1992 | Pasiecznik, Jr. | |
| 5,197,184 | 3/1993 | Crumly et al. | |
| 5,313,157 | 5/1994 | Pasiecznik, Jr. | |
| 5,370,974 | * 12/1994 | Agostino et al. | 430/270 |
| 5,499,128 | * 3/1996 | Hasegawa et al. | 349/155 |

FOREIGN PATENT DOCUMENTS 3-182718 * 8/1991 (JP).

OTHER PUBLICATIONS

*Multichip Module Design, Fabrication and Testing*, J. J. Licari (McGraw–Hill, Inc., New York, 1995) No Date Provided.

* cited by examiner

Primary Examiner—William L. Sikes
Assistant Examiner—Tai V. Duong
(74) Attorney, Agent, or Firm—V. D. Duraiswamy; M. W. Sales

(57) ABSTRACT

A method for producing topographic projections, especially useful for producing many small projections of less than about 100 $\mu$m in diameter and in height. This method is useful for making contact pads of membrane probes used to test integrated circuits and spacers of liquid crystal light valves.

11 Claims, 2 Drawing Sheets

METHOD FOR MAKING TOPOGRAPHIC PROJECTIONS

TECHNICAL FIELD

The present invention is in the field of production of topographic projections, in particular projections with dimensions in the micrometer range.

BACKGROUND OF THE INVENTION

Liquid crystal light valves (LCLVs) generally employ cells containing liquid crystal molecules. When the ordering of the liquid crystal molecules in regions of the cell is changed (for example, by means of a local electric field), the optical properties of those regions also change. Examples of LCLVs are disclosed in U.S. Pat. Nos. 4,728,174 and 4,826,293. Generally, a LCLV includes a layer of liquid crystal enclosed in a cell formed by insulating films on either side to provide electrical and chemical isolation. Optical images can thus be produced by a spatial voltage pattern applied to the device.

In LCLV displays, topographic projections ("bumps") are used to keep neighboring planar surfaces at a fixed distance apart from one another. The liquid crystal thickness of LCLV, which is critical to the device performance, is traditionally maintained by using plastic shim spacers (cutout sheets of plastic) or evaporated dots of silicon monoxide "posts". Each post is large in scale (typically one millimeter in diameter or larger) and restricted to use around the outer edges of the device. A thickness variation thus results if the surfaces of the device are not precisely flat. In an alternative spacing method, small glass beads (typically between 3 to 4 micrometers in diameter) are strewn onto a sublayer to serve as spacers. This method is deficient in that the locations where the glass beads finally land cannot be predetermined, so the distribution pattern of the beads cannot be controlled. Further, although the glass beads are relatively small, they tend to clump together into larger lumps which cast shadows, i.e. artifacts, onto the LCLV read-out.

A membrane probe is used for testing integrated circuits. An example of a membrane probe and the apparatus utilizing it are disclosed in U.S. Pat. Nos. 5,313,157 and 5,148,103, respectively. Such a probe comprises a flexible membrane having a pattern of electrically conductive traces formed on one side of the membrane, and a plurality of contact pads on selected ones of the traces to provide a temporary electrical connection to the circuit under test. Connector pads on the other side of the membrane are connected electrically to the traces to facilitate rapid detachable electric connection to a test fixture.

In membrane probe devices for testing integrated circuits, small projections (of about 3 to 6 $\mu$m in diameter, and 25 to 50 $\mu$m in height) are used to assure that a low resistance electrical contact is made at precise locations over distributed surfaces. There are several conventional ways to fabricate the projections on membrane probes. In one process disclosed in U.S. Pat. No. 5,197,184, the projecting contacts are produced as a mold on a metallic plate. Polyimide isolating layers and metal interconnecting layers are laminated and delineated to build up the test probe. This multilayer sheet is then demounted from the metal plate and attached to a stiffer substrate with the center removed to provide a tight membrane that can be deflected by air pressure or mechanically to contact the integrated circuits (ICs) under test. An alternative process has been used in which a photoresist mask is prepared with holes where the contact metal will be electroplated up to form the projection. These projections are generally flat-topped and make a relatively poor contact with the IC. These projections are difficult to prepare in diameters less than about 100 $\mu$m. Moreover, due to their small sizes, the adherence of the contact metal to the metal traces is poor. In yet another process, the contact pads on the signal traces are made by depositing a thick metal film and etching away the excess metal around the projection. This is a slow and costly process.

SUMMARY OF THE INVENTION

The present invention presents a method for producing topographic projections. The method is especially useful for producing many small projections of less than about 100 $\mu$m in diameter (and preferably from about 3 to 6 $\mu$m in diameter), and of less than about 100 $\mu$m (and preferably of about 25 to 50 $\mu$m) in height. Though the method can make projections of up to 100 $\mu$m or more in diameter, it has the advantage over the prior art in permitting the making of smaller projections, especially those of less than about 50 $\mu$m in diameter, in particular projections with heights that are proportionately greater than their diameters. The method allows for specific placement, in a predetermined pattern, of multiple projections with specific dimensions. The method utilizes optical exposure and processing of a photodefinable material, such as preimidized polyimide material. The height of each projection is controlled by the initial thickness of the photodefinable material. The size, shape, and location of each projection is determined by the use of a photomask to expose only the polyimide in the vicinity of the projection. The unexposed material is removed, e.g., by washing or etching, in the development process. The final shaping and hardening of the projection is preferably accomplished by a thermal curing process.

The projections have many uses. Their properties may be varied according to their intended uses. For example, they may be insulating or conducting. They may be used between two layers of materials to either insulate or allow electrical or heat conduction between the two layers. Electrically insulating projections can be used, for example, in LCLVs to separate and prevent the movement of charges/electrons from a photoactivated or electrically activated image input substrate to the counter electrode on the side of the LCLV display. In membrane probes, the projections may be made of a conducting material. If the projections are made of insulating material, it can be layered, covered or encapsulated with a conducting material, such as a metal. These conducting projections allow electrical conduction between the ICs and the membrane probe for testing of the functioning of the ICs.

The projections can also serve to physically separate one material from another. For example, they can be used to maintain two layers of materials at a desired distance from each other. As such, they find uses in LCLV and membrane probes as further described below.

DETAILED DESCRIPTION OF THE INVENTION

Figure 3:
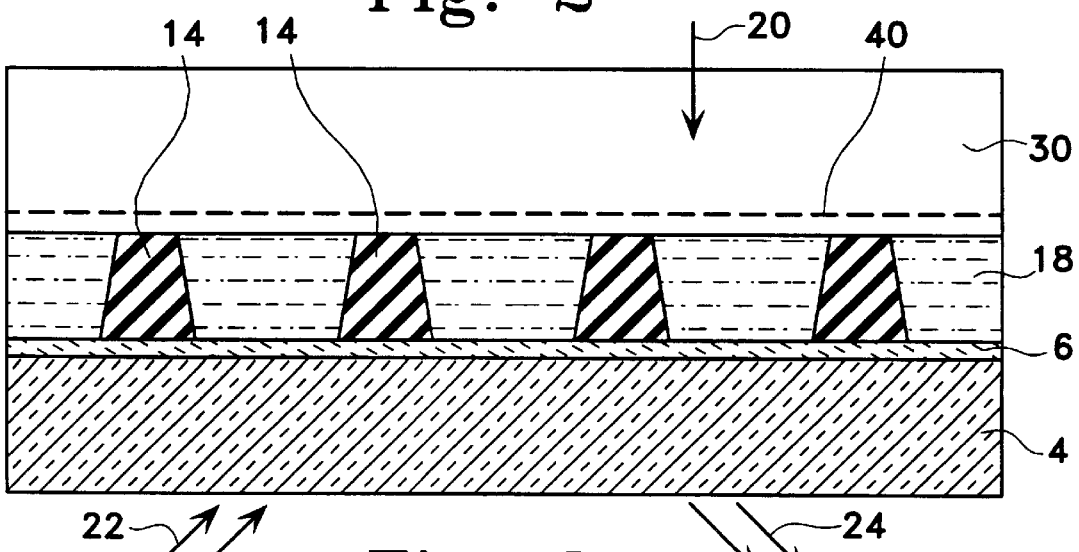

The method is useful for producing projections on LCLV displays and membrane-type testing devices. These projections can be used in a wide variety of liquid crystal display devices, e.g., in large screen professional projectors, active matrix displays, helmet mounted goggle displays, and electron-beam activated large screen displays. The method can be used to produce small projections which can be strategically distributed at precise locations in the active area of the LCLV and can be small enough, such as less than 6 μm in diameter (e.g., between 3 to 6 μm in diameter) that they cannot be seen in the projected image. For example, the projections can be 4 μm in diameter and 6 μm in height. The projections are preferably evenly distributed in the LCLV. The projections can be made small and strategically distributed across the display areas to act as automatic spacer stops (spacers) for the opposing faces so that the liquid crystal thickness may be precisely controlled and maintain the liquid crystal at a predetermined thickness. In electron-beam activated displays, this is particularly important because one side of the device is a stretched membrane that can deform excessively across the active area of the device. FIG. 3 presents a simplified illustration of a LCLV. The projections 14 keep the conductive coating 6 on the glass substrate 4, at a desired distance from the image input substrate 30 and the mirror 40. That is, the projections 14 substantially maintain the width of the liquid crystal 18.

Flexible membrane probes require conductive bumps known as "topographic interstitial contacts" (TICs) to make contact with ICs under test. For this use, the projections of the present invention can be encapsulated in metal films and provide the shaped contacts for the probe. The encapsulation may be achieved using methods known in the art, such as flash coating with metals. The TICs make use of a photodefined, shaped projection structure that is covered with a metal layer to permit any number of well defined contact pads to be prepared economically and assure reliable contacts to the test circuitry.

Figure 5:
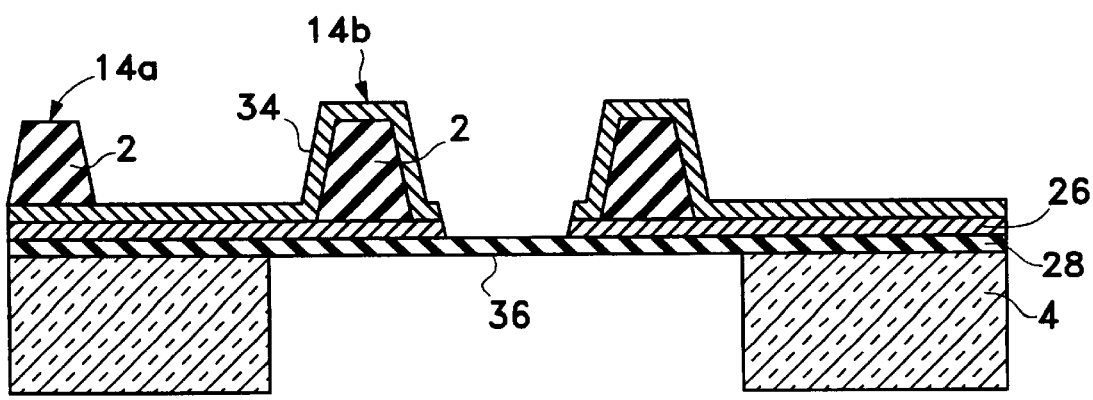

Another aspect of the present invention presents the use of non-conductive projections to maintain a desired distance between the membrane probe and the wafer containing the microchips or ICs. This is especially useful because the surface of the membrane probe in contact with the wafer often deforms (particularly around the electrical contact pads) under the force which brought the membrane probe into contact with the wafer. Thus, the present invention utilizes additional non-conductive projections strategically distributed around the membrane probe to prevent it from deforming (and making electrical contacts with undesirable parts of the ICs on the wafer) and to keep a working distance between the wafer and the membrane probe. The non-conductive projections are especially useful to prevent the electrical circuits on the ICs from contacting the metal traces 34 of the membrane probe, instead of the electrically conductive contact pads 14b. They may be used in conjunction with the electrically conducting projections, with the latter serving as electrical conduits. FIG. 5 is a simplified representation of a membrane probe showing the electrically conducting contact pads 14b, which comprises projections 14 made of an insulating material but covered with conductive materials, preferably metal traces 34. Alternatively, the conductive contact pads 14b could be made from a conductive photodefinable polyimide, thus obviating the need to cover the pads with conducting metal. To the left of FIG. 5 is shown a non-conductive projection 14a, which comprises a projection 14 made of an insulating material and not covered with any conductive material. The non-conductive projection 14a is preferably placed such that it prevents the ICs from contacting the metal traces 34 that are not on the conducting contact pads 14b. For example, in FIG. 5, the non-conductive projection 14a is behind the metal traces 34 to prevent the wafer from deforming downward and the ICs from contacting the metal traces 34 outside of the desired area of the conductive contact pads 14b.

In recent approaches to high density, low cost packaging of ICs, full 8-inch diameter wafers of ICs would be laminated to feedthrough plates then sawn apart to provide sealed, packaged dies for easy insertion into multichip modules. To accomplish a reliable interconnect during the assembly lamination, compliant vertical projections (bumps) must be prepared on the wafer or the feedthrough plate. The projections of the present invention are ideal for this assembly. The production of a vertical interconnects through laminated feedthrough covering plates requires conductive projections to assure the interconnects. The projections with metal encapsulation (that can include solderable metals for permanent reliable connections) permits the lamination to be done and guaranties durable electrical interconnects within the package.

This method of making new projections is also beneficial as new probes are being developed which will require 10,000 or more contacts to be made simultaneously during the testing operation. Flip chip and integrated microelectronic packages that have been proposed for low cost system assembly will also require topographic projections to assure reliable internal connections of the input/output leads.

In the present method, a layer of photodefinable material is overlaid onto a sublayer. The photodefinable material is masked to delineate the areas from which the projections will be formed. Next, the masked photodefinable material is exposed to radiation, whereby the irradiated areas of the photodefinable material become resistant to removal. Then the unirradiated areas of the photodefinable material is removed to leave the irradiated areas to serve as the projections.

Compared to the current art, the method of the present invention provides an economical, easier, and more reproducible method for fabricating projections, especially a wider variety of projections of different sizes on the same substrate. The method also has the advantage of allowing a large number of individual projections, especially those in the micrometer range, to be made in predetermined locations on a substrate. If need be, the method provides a reproducible, e.g. even coating of metal on the small projections. In contrast, methods of current art do not provide for topography projections having a reproducible surface topography. For example, one conventional method uses a mask with apertures where the contact metal is to be electroplated up to form the projections. It is very difficult to completely and evenly sputter a thick coat of metal through a small aperture, especially an aperture in the micrometer range.

If the projections are used to maintain the distance between two layers of materials, the photodefinable material is preferably chosen and cured such that the resulting projections do not substantially deform or compress, but substantially retain their heights, during use.

The preferred photodefinable material is preimidized polyimide which is hardened upon exposure to ultra-violet (UV) light. Examples of preimidized polyimides are: Ultradel 7501 and Ultradel 7505 which has more solid content than Ultradel 7501 (available from Amoco Chemical Company, Chicago, Ill., U.S.A.). Preimidized polyimide is preferred over postimidized polyimide because the latter tends to shrink too much after curing. The resulting irradiated polyimide is resistant to conventional spray development by xylene. Thus, the unirradiated regions are removed by xylene development. Besides xylene development, other methods which selectively remove the unirradiated parts of the polyimide may also be used. Preferably, the polyimide is then cured according to the manufacturers' instruction. Ultradel 7501 and Ultradel 7505 are typically hard cured to between 350 to 400° C., up to 5 hours. Surprisingly, preimidized photodefinable materials adhere well to the sublayer without separating from the substrate, they are able to withstand the xylene development, and may be used to form projections with a high height to diameter ratio within very close tolerance.

The following describes two preferred methods for making the projections, using as examples, spacers 14 for a LCLV; and electrically conductive contact pads 14b and a non-conductive projection 14a for a membrane probe.

Non-Conductive Spacers for Use In Liquid Crystal Light Valves

In LCLV, the sublayer supporting the projection is typically a conductive, preferably transparent, coating. Examples of the transparent coatings are: indium-tin oxide, tin oxide and indium oxide. The sublayer may also be non-conductive and/or non-transparent depending on the particular application. Examples of other sublayers are: ceramic materials, glass (for example, Foturan which is commercially available from Schott Glass Technologies Inc., Mainz, Germany; PEG3 which is commercially available from Hoya Corporation, Tokyo, Japan; and Fotoceram which was commercially available from Corning Glass Co., Corning, N.Y., U.S.A.), silicon, plastic, polyimide, and Teflon. Preferably, for a LCLV, the sublayer and the substance which comprises the projections have the same coefficients of expansion.

Figure 1:
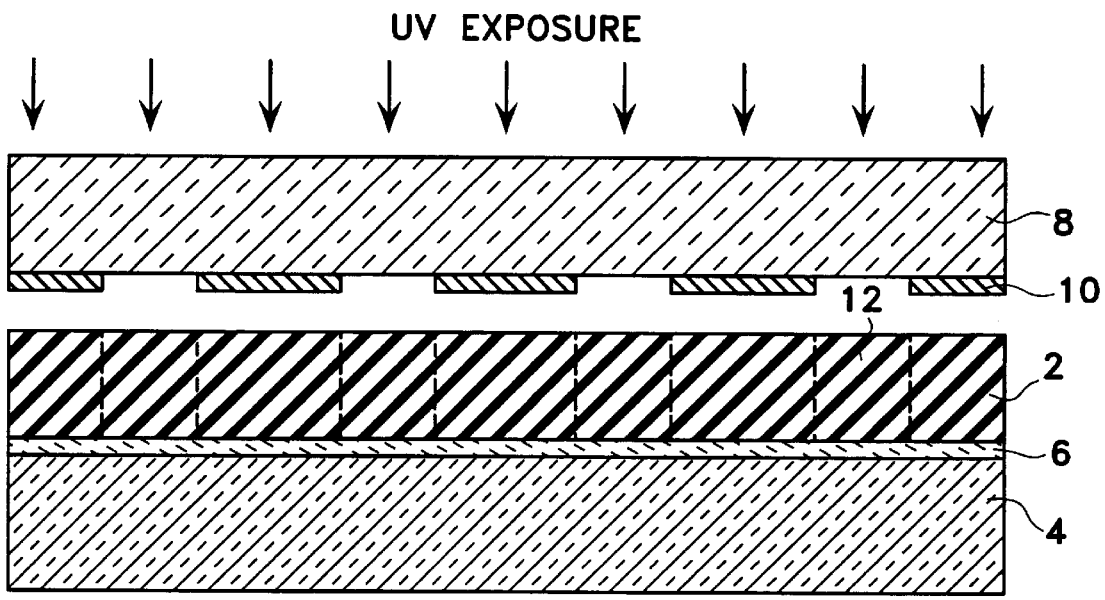
FIGS. 1 to 3 show the successive main steps of a method for making projections (in the form of insulating spacers) for use in crystal light valves.
Figure 2:
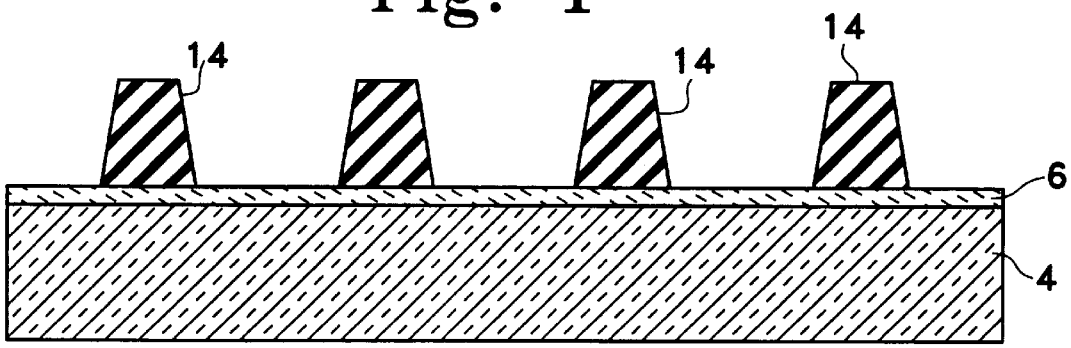

FIGS. 1 to 3 show the successive main steps of a method for making projections (as polyimide spacers 14) for use in liquid crystal light valves. As shown in FIG. 1, counter electrode consisting of a flat, polished glass plate 4 is coated with a transparent conductive coating 6 such as indium-tin oxide (ITO). This is overcoated with a thick photodefinable material, which is preferably preimidized polyimide 2. In both FIGS. 1 and 4 (for LCLV and membrane probe, respectively), a photomask 8 containing opaque metal 10 is used to expose, e.g., by means of ultra-violet (UV) exposure, the polyimide 2 in regions that will form the projections 14. The regions which will become the projections are marked as 12.

As shown in FIG. 2, after exposure, the unexposed polyimide is washed away by xylene spray development, leaving the topographic projections 14. The projections 14 are thermally hard cured at 350° C. for 5 hours, to a very stable form. Then the liquid crystal device is assembled as shown in FIG. 3. The liquid crystal 18 is introduced into the gap between the spacers 14 and the device is sealed and ready for operation. The assembly method for the LCLV and its other components can be those known in the art, such as disclosed in U.S. Pat. Nos. 4,728,174 and 4,826,293.

In operation, the image input 20 is introduced (electrically or optically) through the image input substrate 30, impressed through the dielectric mirror or dielectric matrix mirror 40, and into the liquid crystal 18 which modulates the projection light from the other, read-out, side. Spacers 14 prevent the glass 4 and the conductive coating 6 from approaching the image input substrate 30 and the mirror 40 to less than the desired spacing or distance. An optical readout beam 22 is directed onto the LCLV from the read-out side and is reflected by the mirror 40, as a modulated output beam 24, after it has been modulated according with the image input 20, e.g., of an electron beam pattern. A transparent cover plate, preferably made from glass 4, covers and protects the read-out side of the LCLV. The image input substrate 30 is a substrate which can be electrically activated, photoactivated, or activated by electrons. The angle at which the image input 20 enters the image input substrate 30 depends in known fashion on the particular type of LCLV used.

Contact Pads and Spacers for Use in Membrane Probes

Figure 4:
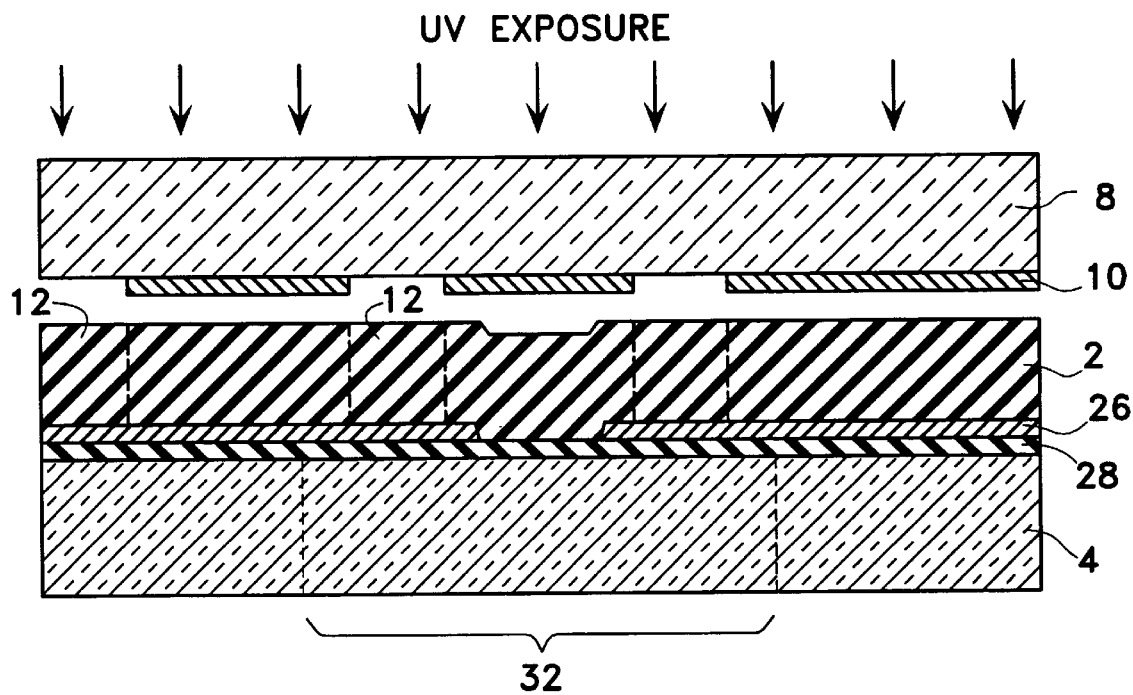
FIGS. 4 to 5 show the successive main steps of a method for making projections (in the form of conducting contact pads and a nonconductive projection) on a membrane probe.

In the membrane probe of FIGS. 4 and 5, the sublayers comprise metal signal traces and a polyimide layer. In this case, the sublayer of polyimide is preferably postimidized polyimide which adheres well the photodefinable glass 4, and can withstand etching of the glass 4 to produce the flexible membrane 36 (as shown in FIGS. 4 and 5). Examples of metal layers in the metal signal traces are: W (10% Ti) plus copper, or Ti plus gold. "W" denotes tungsten; and "Ti" denotes titanium. Examples of postimidized polyimides are: Hitachi PIX 3500 (available from Hitachi Corp., Santa Clara, Calif., U.S.A.); DuPont 2555, PI-2570, PI-2571, and PI-2573 (all available from DuPont Electronics, Wilmington, Del., U.S.A.). The postimidized polyimide may sandwich or contain other materials to strengthen or otherwise improve it.

FIGS. 4 to 5 show the successive main steps of a method for making projections on a membrane probe. The projections are conductive contact pads 14b and a spacer (non-conductive projection) 14a. It will be understood that the metal traces 34 and signal traces 26 are positioned as shown merely for purposes of exposition and that other conductive traces may be included at various locations in the membrane probe.

Unless specific conditions are recited, methods known in the art are used in the following description. For example, the layering and curing of the polyimide, the xylene spray development, the evaporation and sputtering of metal(s) onto the projections, the methods for making and metalizing the vias, and the etching of the glass 4 may be accomplished using standard methods and metals known in the art, such as used for making membrane probes. Examples of these methods are disclosed in *Multichip Module Design, Fabrication, and Testing* by J. J. Licari (McGraw-Hill Inc., New York, 1995), U.S. Pat. Nos. 5,313,157 and 5,148,103, and the manufacturers' instructions regarding xylene spray development and the particular polyimides used.

Referring to FIG. 4, the starting material is a photodefinable glass 4. The glass 4 is preferably in the form of a solid, substantially rigid and self-supporting disc. Preferably, the disc has the diameter of a standard wafer and may be either three inches or six inches in diameter. The glass 4 is also commercially available in a square of twenty inches by twenty inches in size. The thickness of the glass is not a crucial factor, as an example, it can have a thickness of from about 30 to 100 mils.

The glass 4 is commercially available with preformed feedthrough holes which have been previously etched into the glass. Regions of the glass have been preexposed to form etchable latent image 32 (converted to an etchable, "opal", form of glass) to make this area easily etched after the probe has been fabricated. The glass 4 is cleaned, the feedthroughs are filled with a conductive frit, and the glass 4 is again cleaned using methods known in the art.

Next, the top and bottom of the glass 4 are metalized by sputtering a metal or a mixture of metals, such as a mixture of tungsten with a small amount of titanium, or pure Ti (500 Å), Au (3$\mu$) and Ti (500 Å). The sputtering is preferably accomplished by means of a MRC 943 machine made by Materials Research Corporation, Orangeburg, N.Y., and in the absence of grease. Then using the photolithographic process, the metals are etched to make the contact pads on both sides of the glass 4. The photoresist is then removed from the surface of the resulting product by cleaning with solvents, then with oxygen plasma for 2 minutes, and argon for 2 minutes.

Next, an adherent base layer of polyimide 28 is applied to the top of the glass 4. This base layer of polyimide 28 is capable of adhering to the glass 4 and imidization in a subsequent curing process (examples of such polyimides are Hitachi PIX 3500, DuPont 2555, PI-2570, PI-2571, and PI-2573). The base layer of polyimide 28 is applied to the top of the glass 4 by employing standard spinning techniques in which a small amount of polyimide is placed on the surface of the glass 4 and the disc spun to centrifugally distribute the polyimide evenly and radially outwardly. Although the polyimide film may be applied in various ways, the spinning process is preferred because it yields a film that, although axially flexible in the etched opal area (etchable latent image) 32 or membrane 36, is radially taut that the film is dimensionally stable in the plane of the film but may be flexed outwardly by gas pressure. A pattern of vias is photolithographically produced by applying resist in a suitable pattern to the polyimide layer 28. The photolithographic process is the same as that described above for the glass 4. The polyimide is then cured to 350° C. for 5 hours. There may be additional layers of the same or different polyimide below this base layer of polyimide layer 28.

Next, a metal or layers of metals, such as Ti (500 Å), Cu (5$\mu$), Ti (500 Å), are sputtered over the entire upper surface of the polyimide layer 28. Signal traces 26 and metalized vias are then formed by photolithography, sputtering, etching and removal of photoresistive contaminants according to the methods used for the glass 4, above.

Next, an adhesive promoter is spun, at 5000 revolutions per minute (rpm) for 30 seconds, onto the top of the base layer of polyimide layer 28 to form an adhesive layer. The resulting wafer is baked on a hot plate at 100° C. for 30 seconds. (Polyimide manufacturers provide tailor-made adhesive promoters and specify the conditions of their uses according to the polyimides used.) Then, a small amount of photodefinable polyimide 2, preferably preimidized polyimide such as Ultradel 7501 and Ultradel 7505, is placed in the center of the wafer and spun, at 500 rpm for 30 seconds, then 2000 rpm for 30 seconds, onto the above adhesive layer to form a layer of photodefinable polyimide 2. The resulting wafer is baked on a hot plate at 100° C. for 4 minutes. FIG. 4 shows the product with the photodefinable polyimide 2 coated over the metal layer that forms the signal traces or interconnects 26.

The photomask 8 defines the placement and shape of the projections 14. Xylene spray development is used to remove the unirradiated polyimide. The topographic projections 14 are thermally cured as described above. Surprisingly, the polyimide shrinks non-linearly during curing to produce a projection 14 with a pronounced conical shape. The conical shape is especially advantageous for the electrical contact pads 14b, because its pointed end allows the contact pads 14b to pierce a layer of insulating oxide, which is normally on the external metallic surfaces of an IC, to effectuate electrical contact between the electrical contact pad 14b and the ICs. In membrane probe and packaging applications, the contact pads 14b must be electrically conductive. Therefore, as shown in FIG. 5, the projections 14 are preferably covered by an evaporated or sputtered metal film which encapsulates the polyimide 2 and forms the electrical contact pads 14b.

The contact pads 14b may be flash coated with a highly stable conductive material such as a nickel-gold flash coating. Alternatively, the conductive contact pads 14b could be made from a conductive photodefinable polyimide, thus obviating the need to encapsulate or coat the pads with one or more conducting metals. The interconnecting signal traces 26 and metal traces 34 are deposited on top of the cured polyimide. The photoresist contaminants are cleaned from the resulting product as described before.

In one example, the non-conductive projection 14a on the left of FIG. 5 is a projection 14 made of an insulating material, the projection is prevented from being coated with metal by photomasking it using methods known in the art. Alternatively, the metals can be etched away from projection 14 using photomasking techniques known in the art to make the nonconductive projection 14a. In either alternative, one or more of the non-conductive projections 14a serve to keep the membrane or sublayer 36 at a desired distance from a second layer (e.g., external metallic surface of an IC), as with the LCLV shown in FIG. 3.

For use as a membrane probe, the preexposed photodefinable glass substrate 4 is then etched away from the back side leaving the tight membrane 36 ready for deflection to contact and test ICs. The contact pads 14b are on top of the tight membrane material 36.

The foregoing is meant to illustrate, but not to limit, the scope of the invention. Within the scope of the present claims are other embodiments or modifications which one skilled in the art is capable of making, based on the teachings herein and what is known in the art, without undue experimentation.

We claim:

1. A method for making projections from a layer of photodefinable material overlaying a sublayer, wherein the method allows the formation of a number of small, well defined projections of less than about 100 $\mu$m in diameter and in height, said projection being of a desired pattern on the sublayer, said method comprising the steps of:
   masking the photodefinable material to delineate areas from which the projections will be formed;
   exposing the unmasked areas of photodefinable material to radiation, whereby the irradiated areas of the photodefinable material become resistant to removal; and
   removing the nonirradiated areas of the photodefinable material to leave the irradiated areas as projections, each one of said projections having a height proportionately greater than its diameter and said projections being comprised of a substance which has the same coefficient of expansion as the sublayer.

2. The method of claim 1, wherein the photodefinable material is insulating.

3. The method of claim 2, wherein the photodefinable material is preimidized polyimide.

4. The method of claim 3, wherein the radiation is ultra-violet radiation.

5. The method of claim 4, wherein the nonirradiated areas of the preimidized polyimide is removed by xylene.

6. The method of claim 5, further comprising the step of: covering the projections with an electrically conductive material.

7. The method of claim 3, wherein one or more of the projections serve to separate, at a desired distance, the sublayer from another layer in contact with the top of the projections.

8. The method of claim 1, wherein the sublayer is selected from the group consisting of: ceramic, glass, silicon, plastic, polyimide, metal and Teflon.

9. The method of claim 6, wherein the sublayer comprises a conducting material and one or more of the projections serve as electrical contacts between the sublayer and any conducting material which contacts the projections.

10. A method of making projections from a layer of photodefinable material overlaying a sublayer, wherein the method allows the formation of a number of small, well defined projections being of a desired pattern on the sublayer, said method comprising the steps of:

masking the photodefinable material to delineate areas from which the projections will be formed;

exposing the unmasked areas of photodefinable matyerial to radiation whereby the irradiated areas of the photodefinable material become resistant to removal; and removing the nonirradiated areas of the photodefinable material to leave the irradiated areas as projections, each one of said projections having a height from about 25 to 50 $\mu$m and a diameter from about 3 to 6 $\mu$m diameter and said projections being comprised of a substance which has the same coefficient of expansion as the sublayer.

11. A method of making projections from a layer of photodefinable material overlaying a sublayer, wherein the method allows the formation of a number of small, well defined projections of less than about 100 $\mu$m in diameter and in height wherein said height is greater than said diameter, said projections being of a desired pattern on the sublayer, said method comprising the steps of:

masking the photodefinable material to delineate areas from which the projections will be formed;

exposing the unmasked areas of photodefinable material to radiation, whereby the irradiated areas of the photodefinable material become resistant to removal;

removing the nonirradiated areas of the photodefinable material to leave the irradiated areas as projections; and adding an electrically conductive component to one or more of the projections, whereby at least one of the projections is electrically conducting and serve as electrical contacts between the sublayer and a second layer, and at least another of the projections is electrically non-conductive and serves to keep the sublayer at a desired distance from the second layer.

* * * * *